United States Patent [19]

Monick et al.

[11] Patent Number: 4,765,908
[45] Date of Patent: Aug. 23, 1988

[54] PROCESS AND COMPOSITION FOR REMOVING CONTAMINANTS FROM WASTEWATER

[76] Inventors: Barbara Monick; Alexander Blake, both of 9 Greenwich Rd., Smithtown, N.Y. 11787

[21] Appl. No.: 16,503

[22] Filed: Feb. 17, 1987

Related U.S. Application Data

[63] Continuation of Ser. No. 697,709, Feb. 4, 1985, abandoned, which is a continuation-in-part of Ser. No. 522,794, Aug. 12, 1983, abandoned.

[51] Int. Cl.$^4$ .................. B01D 15/00; B01J 20/12
[52] U.S. Cl. ..................... 210/666; 210/667; 210/728; 210/912; 210/913; 252/175; 252/181
[58] Field of Search ............... 252/175, 181; 210/665, 210/666, 667, 723, 724, 725, 728, 912, 913

[56] References Cited

U.S. PATENT DOCUMENTS

| | | | |
|---|---|---|---|
| 2,345,827 | 4/1944 | Olin | 210/23 |
| 2,362,022 | 11/1944 | Olin | 210/23 |
| 2,529,177 | 12/1947 | Neiland et al. | 210/23 |
| 3,066,095 | 11/1962 | Hronas | 210/53 |
| 3,128,249 | 4/1964 | Pye et al. | 210/53 |
| 3,130,167 | 4/1964 | Green | 252/181 |
| 3,142,638 | 7/1964 | Blaisdell | 210/52 |
| 3,219,578 | 11/1965 | Cruickshank et al. | 210/52 |
| 3,268,443 | 8/1966 | Cann | 210/47 |
| 3,276,998 | 10/1966 | Green | 210/52 |
| 3,300,406 | 1/1967 | Pollio | 210/52 |
| 3,474,033 | 4/1967 | Stout et al. | 210/50 |
| 3,578,587 | 5/1971 | Kemmer | 252/181 |
| 3,617,561 | 11/1971 | Fanselow | 210/47 |
| 3,928,195 | 12/1975 | Hoeltgen et al. | 210/49 |
| 4,008,161 | 2/1977 | Wong et al. | 210/666 |
| 4,332,693 | 6/1982 | Piepho | 252/181 |

FOREIGN PATENT DOCUMENTS 2615325 11/1976 Fed. Rep. of Germany .
45780 8/1973 Japan .

*Primary Examiner*—Robert Wax
*Attorney, Agent, or Firm*—Finnegan, Henderson, Farabow, Garrett & Dunner

[57] ABSTRACT

A treatment composition and method is provided for removing a plurality of contaminants from a wastewater system in the form of a nonleachable sludge. The treatment composition comprises an alkali or alkaline carbonate; activated montmorrilonite; a catalyst, such as zirconium and polyelectrolyte; one or more flocculants, such as a metal salt and calcium oxide, lime, or calcium hydroxide; and bentonite. Additionally, the treatment composition may contain soda ash, lignite, and activated carbon. The treatment composition is introduced and mixed with the wastewater, which is then filtered to produce a sludge containing the contaminants in a nonleachable form.

22 Claims, 2 Drawing Sheets

PROCESS AND COMPOSITION FOR REMOVING CONTAMINANTS FROM WASTEWATER

This application is a continuation of application Ser. No. 697,709, abandoned, filed Feb. 4, 1985, which is a continuation-in-part of application Ser. No. 522,794, Aug. 12, 1983, now abandoned.

BACKGROUND OF THE INVENTION

This invention relates to wastewater treatment and, more particularly, to the removal of industrial contaminants from wastewater to produce a sludge containing the contaminants in a non-leachable condition.

Most types of industries produce wastewater in the course of the manufacturing operation. Various environmental laws regulate the discharge or disposal of the wastewater into natural streams, municipal sewers, land surfaces, or underground reservoirs, since the wastewater usually contains hazardous or undesireable concentrations of contaminants. Generally, these environmental regulations prohibit the concentration levels of the contaminants from exceeding specific limits, which have been determined to ensure a relatively safe and healthy water system.

Many industrial processes, however, produce wastewater that contain contaminants, such as phosphates, heavy metals, nitrates, nitrites, sulfides, sulfites, oils, dyes, fats, arsenic, mercury, or organic compounds, which greatly exceed the prescribed limits for safe disposal. The sludge that results from various industrial and treating methods often endangers the environment, since the sludge contains the contaminants in a highly unstable and leachable condition. Contaminants from unstabilized sludge may leach from the sludge into the surrounding ground water, soil, and streams and, cause environmental damage.

Various methods have been proposed to treat, remove, or stabilize hazardous contaminants contained within wastewater. Unfortunately, these prior methods fail to remove, in a single step, a multiplicity of contaminants in a short amount of time, and to use low cost equipment to produce a sludge having the contaminants in a non-leachable condition. For example, a particular process may remove some contaminants, but the wastewater still requires additional treatment to remove all pollutants prior to the safe discharge of the wastewater. Other methods may remove the contaminants from the wastewater in the form of a sludge, but, the contaminants readily leach from the sludge into the surrounding environment. Typically, many prior treatment techniques require a large expenditure of capital for equipment specifically designed for the particular treatment process. In short, current technology has failed to provide a quick, efficient, relatively inexpensive, and easy to use wastewater treatment process.

The present invention obviates these inherent problems and shortcomings by providing a wastewater treatment method capable of removing a plurality of diverse contaminants from a wastewater system and fixing the contaminants in nonleachable form in a sludge. The present invention achieves a high degree of removal in a quick, efficient, relatively inexpensive, and easy to use method. The present invention is applicable to a number of different industrial wastewater systems. Treatment compositions of the present invention are capable of removing a variety of contaminants, such as phosphates, nitrites, nitrates, sulfides, sulfates, chromium, arsenic, barium, mercury, selenium, cyanide, heavy metals, hexane solubles, such as oil and grease, paints, dyes, latex, starch, and cooling emulsions. In most cases, the present removal system is capable of removing the various contaminants in a single flow treatment, without the need of repetitive treatments. The present process also significantly lowers organic material concentrations in the wastewater as measured by the Biochemical Demand (BOD) or Chemical Oxygen Demand (COD) tests, without adversely affecting the pH of the wastewater system. Additionally, the present technique does not create undesirable carbon or resinous conditions in the treated water.

SUMMARY OF THE INVENTION

The present invention provides a treatment composition for removing contaminants from a wastewater system. The treatment composition comprises effective amounts of activated montmorillonite; bentonite; one or more flocculants; an alkali metal or alkaline earth metal carbonate; and a catalyst comprising zirconium and at least one polyelectrolyte.

More specifically, the treatment composition comprises about 5 to 38% of a metal salt; about 1 to 4% of an alkali or alkaline carbonate; about 25 to 49% activated montmorillonite; 1.2 to 5.5% of a catalyst comprising zirconium and at least one polyelectrolyte; about 8 to 30% calcium oxide, lime, calcium hydroxide, or mixtures thereof; and about 14 to 30% bentonite.

It is to be understood that the above indicated percentages refer to each component's percentage of the total treatment composition, as used to treat the wastewater system. It is also to be understood that the percentages are approximations, with deviations being permitted within the scope of the invention.

The wastewater treatment method of the present invention is capable of removing a plurality of contaminants from wastewater. The method includes the steps of introducing into wastewater, containing one or more contaminants, the treatment composition of the present invention. The wastewater, containing the contaminants and the treatment composition, is mixed. The wastewater is then filtered to produce a sludge containing the contaminants and a filtrate. Additionally, the sludge can be dewatered to produce a desired solid content in the sludge. The method of the present invention can be performed either in a continuous or a batch type process. The treatment method may be performed at the temperature of the wastewater as it emanates from a wastewater source.

As noted, the mechanics employed in the present invention are relatively basic and not extremely expensive. The system usually requires one vessel, which functions as a reaction and settling tank, and a stirrer, such as a high speed agitator to assure proper distribution of the treatment composition. Filtering or dewatering devices may also be used to achieve the proper solid content in a sludge produced by the present process. In the case of large wastewater volumes, more than one reaction container may be used. Therefore, extensive treatment systems or apparati, with separate units for each phase of the treatment, are not necessary. Existing treatment systems may be easily modified to accommodate the present process. The present invention can be used in batch, continuous, or intermittent flow processes. The treatment process of the present invention does not adversely effect the pH of the wastewater system.

BRIEF DESCRIPTION OF THE DRAWINGS

The accompanying drawings, which are incorporated in and constitute a part of the specification, illustrate one embodiment of the invention and, together with the description, serve to explain the principles of the invention.

DESCRIPTION OF THE PREFERRED EMBODIMENTS

Figure 1:
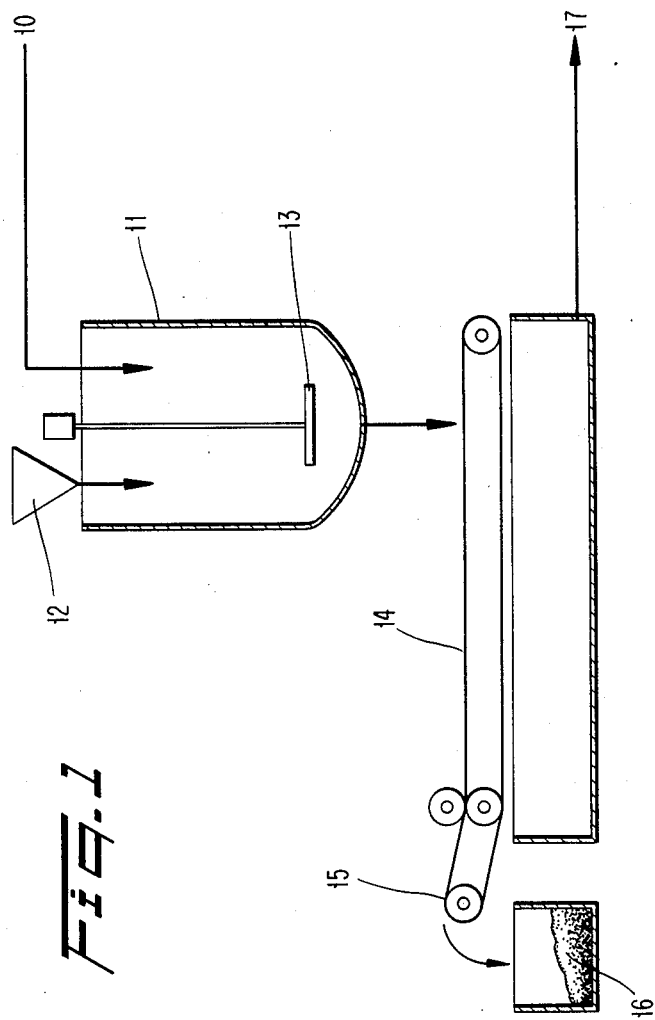
FIG. 1 is a schematic diagram representing one embodiment of apparatus used in the method of the present invention.

The process and treatment composition of the present invention are capable of removing contaminants from a variety of wastewater systems that emanate from diverse manufacturing and industrial sources. Depending upon the particular contaminants contained within a wastewater system, the treatment process and treatment composition may be altered to remove the specific contaminants. As used herein, contaminants will include phosphates, nitrites, nitrates, arsenic, barium, mercury, selenium, cyanide, sulfides, sulfates, heavy metals, hexane solubles, such as oil and grease, paints, dyes, latex, starch, cooling emulsions, and mixtures thereof. As used herein, the term heavy metals will include aluminum, copper, iron, silver, zinc, nickel, lead, cadmium, chromium and mixtures thereof.

To remove effectively and efficiently the contaminants from a wastewater system, the treatment composition comprises effective amounts of activated montmorillonite; bentonite; one or more flocculants; an alkali metal or alkaline earth metal carbonate; and a catalyst comprising zirconium and at least one polyelectrolyte. Preferably, the activated montmorillonite is drilling gel or drilling mud and, most preferably, the drilling gel or mud has a high silica content or at least 60%. The bentonite is preferably calcium (Southern) bentonite, sodium (Western) bentonite, or a mixture thereof. The flocculants are preferably at least one of lime, calcium hydroxide, calcium oxide or a mixture thereof and a metal salt, such as aluminum sulfate. Preferrably, the catalyst is zirconium and a polyelectrolyte. Preferably, the polyelectrolyte is a nonionic or an ionic polyelectrolyte. Preferably, the percent weight of the components in the treatment composition are 25 to 49% montmorillonite, 14 to 30% bentonite, 13 to 68% flocculants, 1 to 4% of the alkali or alkaline carbonate, and 1.2 to 5.5% of the catalyst.

The treatment composition can also include at least one of the following: soda ash, lignite, and activated carbon. If soda ash is part of the composition, its concentration is in the range of about 1 to 10% and, more preferably about 3 to 4%. If lignite is part of the composition, its concentration is in the range of about 5 to b 20%. If activated carbon is part of the composition, its concentration is about 2 to 25% and, more preferably 20 to 25%.

The preferred treatment composition comprises:
(a) About 5 to 38% of a metal salt;
(b) About 1 to an alkali metal or alkaline earth metal carbonate;
(c) About 25 to 49% of an activated montmorillonite;
(d) About 1.2 to 5.5% of a catalyst comprising zirconium and at least one polyelectrolyte;
(e) About 8 to 30% calcium oxide, calcium hydroxide, lime, or a mixture thereof; and
(f) About 14 to 30% bentonite.

If the activated montmorillonite is 49%, the amount of each of the other components in the composition is selected to total 100%.

In the preferred treatment composition, the preferred metal salt is a metal sulfate, such as aluminum sulfate. The preferred carrier-dispersing agent is selected from the group consisting of silica gel, magnesium silicate, magnesium carbonate, marble dust, and ground mica. The preferred activated montmorillonite is drilling mud or drilling gel, more preferably, a drilling mud or gel having a high silica content. Most preferably, the drilling mud or gel has a silica content of at least 60%, and more preferably within the range of 60 to 65%. The preferred polyelectrolyte is a nonionc or ionic polyelectrolye. Preferably, the bentonite is calcium (Southern) bentonite, sodium (Western) bentonite, or a mixture thereof.

Depending upon the contaminants present in the wastewater, one or more of the following components may also be included within the preferred treatment composition:
(a) About 1 to 10% soda ash (sodium carbonate) and, more preferably about 3 to 4%;
(b) About 5 to 20% lignite; and
(c) About 2 to 25% and, more preferably 20 to 25% activated carbon, such as charcoal.

When soda ash, lignite, or activated carbon is added to the treatment composition, the concentration of calcium bentonite may be below the lower limit of its concentration range.

More preferably, the treatment composition comprises:
(a) About 9 to 35% of a metal salt;
(b) About 2 to 4% of an alkali metal or alkaline earth metal carbonate;
(c) About 33 to 42% activated montmorillonite;
(d) About 0.7 to 1.9% of a polyelectrolyte;
(e) 10 to 29% of calcium oxide, calcium hydroxide, lime, or a mixture thereof;
(f) 16 to 28% of bentonite; and 0.4 to 3.0% of zirconium.

In the more preferred treatment composition, the preferred metal salt is a metal sulfate, such as aluminum sulfate. The preferred activiated montmorillonite is drilling mud or drilling gel, most preferably, a drilling mud or gel having a high silica content. Most preferably, the drilling mud or gel has a silica content of at least 60%, and more preferably, within the range of 60 to 65%. The preferred polyelectrolyte is a nonionc or ionic polyelectrolye. Preferably, the bentonite is calcium (Southern) bentonite, sodium (Western) bentonite, or a mixture thereof. The alkali or alkaline carbonate is preferably sodium carbonate, calcium carbonate, or mixtures thereof.

If soda ash is also included in the more preferred treatment composition, it is preferably in the concentration range of 1 to 10% and, more preferably, about 3 to 4%. If lignite is also included in the treatment composition, it is preferably in the concentration range of 5 to 20%. If activated carbon is also included in the treatment composition, its concentration is preferably about 2 to 25%, and, more preferably, 20 to 25%.

Without being bound by theory, it is believed that the metal salt, such as aluminum sulfate, removes small contaminant particles, especially organic contaminants, by acting as a coagulant or flocculant. The metal salt, such as aluminum sulfate, also helps to neutralize the pH of the system. The carrier-dispersing agents, such as silica gel, magnesium silicate, magnesium carbonate, marble dust, and ground mica prevent the caking of the treatment composition during the treatment process. The activated montmorillonite is a binder for the contaminants to encourage the removal of the contaminants from the wastewater. The polyelectrolyte is a catalyst for the treatment process, and it also aids in the splitting of emulsions contained within the wastewater. The calcium oxide, calcium hydroxide, or lime removes small contaminant particles, especially heavy metals, by flocculation. Although other caustics may be used in place of the calcium oxide, calcium hydroxide, or lime, it is believed that the calcium oxide, calcium hydroxide, or lime form hydroxides in the sludge to aid the flocculation. The bentonite removes the contaminants from the wastewater by adsorbing the contaminants.

It is believed, without being bound by theory, that zirconium acts as a pH controller through the prevention of extreme pH adjustments of the composition by other components of the formulation. Zirconium also increases the stability of the sludge and it does not require a carrier. Furthermore, zirconium enhances the adsorption capability of the bentonites and its ability to dewater the treated sludge. It is also believed that the alkali or alkaline carbonate has a significant effect on the stability of metals in the treated sludge.

It is also believed, without being bound by theory, that when soda ash is present in the treatment composition, it aids in the removal of the heavy metals, as defined above, contained in the wastewater. Additionally, it is believed that the soda ash aids in the activation of the montmorillonite. Other neutralizers, such as sodium bicarbonate, may also be used, but the soda ash is preferred due to the increased activation of the montmorillonite in its presence. If lignite is included in the treatment composition, it functions as a precipitation aid, especially for the precipitation of heavy metals. Finally, activated carbon within the range of 2 to 25% and, more preferably about 20 to 25%, may be used to remove organic contaminants present in the wastewater. The carbon, after it adsorbs the organic contaminants, is removed from the wastewater along with the other components in the treatment composition, avoiding contamination of the wastewater with carbon. The type of bentonite used in the treatment composition depends upon the contaminants present within the wastewater system. Sodium bentonite, often referred to as Western bentonite, exhibits good thixotropic properties, and has high swelling capacity in water. In contrast, calcium bentonite, often referred to as Southern bentonite, has a negligible swelling capacity in water. The sodium bentonite and calcium bentonite can be used either individually in the treatment composition or in combination, depending upon the contaminants to be removed from the wastewater.

Usually, sodium (Western) bentonite is particularly effective for removal of contaminants in wastewater from aluminum line waste, such as the can industry. Sodium (Western) bentonite is also particularly effective in removing nitrates, phosphates, dyes, plastics, synthetic oils, cellulose, resins, biochemical demand (BOD) and chemical oxygen demand (COD) from a wastewater system. Calcium (Southern) bentonite is particularly effective in removing contaminants in wastewater from steel line waste. Calcium (Southern) bentonite is also particularly effective in removing heavy metals, oils, latex, wax, starch, fats, urea nitrogen, phosphates and other organic or inorganic matter.

The preferred type of activated montmorillonite is drilling gel or drilling mud used in the oil drilling industry. Such drilling gel or mud is often known, by the name International Gel. Preferably, the activated montmorillonite has a relatively high silica content of at least 60% silica and, more preferably, within the range of 60 to 65%. Generally, it has been found that the higher the silica content in the montmorillonite, the more effective the removal of the contaminants. The proper blend of activated montmorillonite and bentonite to be used in the treatment composition depends upon the contaminants present within the wastewater.

Without being bound by theory, it is believed that the contaminants are entrapped within the interstitial sites of the montmorillonite and bentonite to prevent any subsequent leaching. The highly porous, activated montmorillonite is especially effective in adsorbing the contaminants within its interstitial sites. When added to the wastewater, it is believed that the activated montmorillonite and bentonite form a sludge matrix that absorbs the contaminants, and prevents their subsequent leaching.

Preferably, the polyelectrolyte is nonionic in character. However, other polyelectrolytes, such as cationic and anionic polyelectrolytes, may also be used. Anionic polyelectrolytes are especially useful when the contaminants include heavy metals. A suitable polyelectrolyte for use in the treatment composition is a polyacrylamide sold under the trademark "Celanese 1082."

One of the flocculants is a metal salt. The preferred metal salt is aluminum salt. Other metal salts, known in the art to be flocculants, may also be used in the treatment composition.

The more preferred carrier-dispersing agent is silica gel. The silica gel, it is believed without being bound by theory has the capability of absorbing contaminants of the relatively fine dimensions, and increasing the dryness of the sludge.

The lignite in the treatment composition can either be causticized or uncausticized, depending upon the contaminants in the wastewater. The lignite is preferably added to the treatment composition when the contaminants include heavy metals. Similarly, soda ash may also be used in the treatment composition to remove various heavy metal contaminants.

The treatment composition of the present invention is prepared by adding the various components together to form as much of a homogenous blend as possible. While no specific order of blending is necessary, it has been found that the following preferred order of blending produces a treatment composition that effectively removes the contaminants present in the wastewater.

In the preferred order of blending, zirconium, the polyelectrolytes, and alkali or alkaline carbonates are initially blended together, since the quantity of both components represents a small part of the total treatment composition. The separate blending of these two components assures homogenous blending of these two components. The blended zirconium, polyelectroytes, and alkali or alkaline carbonates are added, as a unit, to a metal salt, such as aluminum sulfate, and then blended again. Thereafter, in order, the following components are added to the treatment composition, with a blending of the composition occurring after each addition and prior to the next addition: activated montmorillonite;

soda ash, if any; calcium oxide; and calcium bentonite, sodium bentonite, or a mixture thereof. Before every new addition, the blend is to be as much of a homogenous mixture as possible. If present in the treatment composition, activiated carbon or lignite is added after the bentonite is blended into the composition.

Preferably, the components of the treatment composition are of standard to fine commercial mesh. However, one or more parts may vary in mesh size to effect a more efficient treatment of the wastewater.

Once the treatment composition is blended together, it is introduced into a wastewaster system containing various contaminants. The amount or concentration of treatment composition added to the wastewater depends upon the concentration and type of contaminants contained within the wastewater and can be readily determined by one of ordinary skill in the art without undue experimentation. The wastewater and treatment composition are mixed together, and then filtered to produce a sludge containing the contaminants and a filtrate. The sludge may also be dewatered to remove excess liquid, and provide a desired solid content in the sludge. Preferably, the solids content in the sludge is within the range of 25 to 30%, although other solids contents are acceptable within the scope of the invention. The resulting nonleachable sludge can be safely used as landfill or disposed of in dump sites without fear that the contaminants will leach.

The treatment method can be performed at either ambient or elevated temperatures. Usually, the treatment method is performed at the temperature of the wastewater as it emanates from the wastewater source. If the process is conducted at a temperature exceeding about 205° C., the bentonite in the sludge will become dry within about two (2) hours. Likewise, the treatment method can be performed at atmospheric pressure, low pressure, or elevated pressure, without adversely affecting the effectiveness of the treatment process.

The introduction and mixing together of the treatment composition and wastewater can be performed in either a batch type or a continuous process. With reference to FIG. 1, a batch type operation of the present invention is shown. Wastewater from a manufacturing plant or other industrial source, is introduced into a mixing and settling tank 11. The treatment composition 12 is also introduced into the tank 11. A stirrer 13 is provided in the tank 11 to mix the treatment composition and wastewater together. Preferably, the stirrer 13 is a high speed mixer to assure an even and fine dispersion of the treatment composition. The creation of a vortex is to be avoided during the mixing. Proper tank configuration and baffling (not shown) in the tank 11, if needed, may be used to avoid the creation of a vortex.

After a sufficiently long enough time to mix the composition and wastewater together, usually about 10 to 20 minutes, a floc begins to form in the tank 11. The wastewater may be filtered to produce a sludge containing the contaminants and a filtrate by draining the wastewater onto a separation device, such as a belt filter 14. Alternatively, other separation devices such as a centrifuge, can also be used. Additionally, various sludge dewatering devices 15, such as wringers, press rollers, or centrifuges, can be used with the separation device to produce a sludge with the desired water content. The belt filter 14 and the dewatering device 15 separate the wastewater into a sludge 16 containing the contaminants and a filtrate 17. Alternatively, the sludge can be allowed to settle in the tank 11, and the filtrate is drained off to leave the sludge at the bottom of the tank 11.

Figure 2:
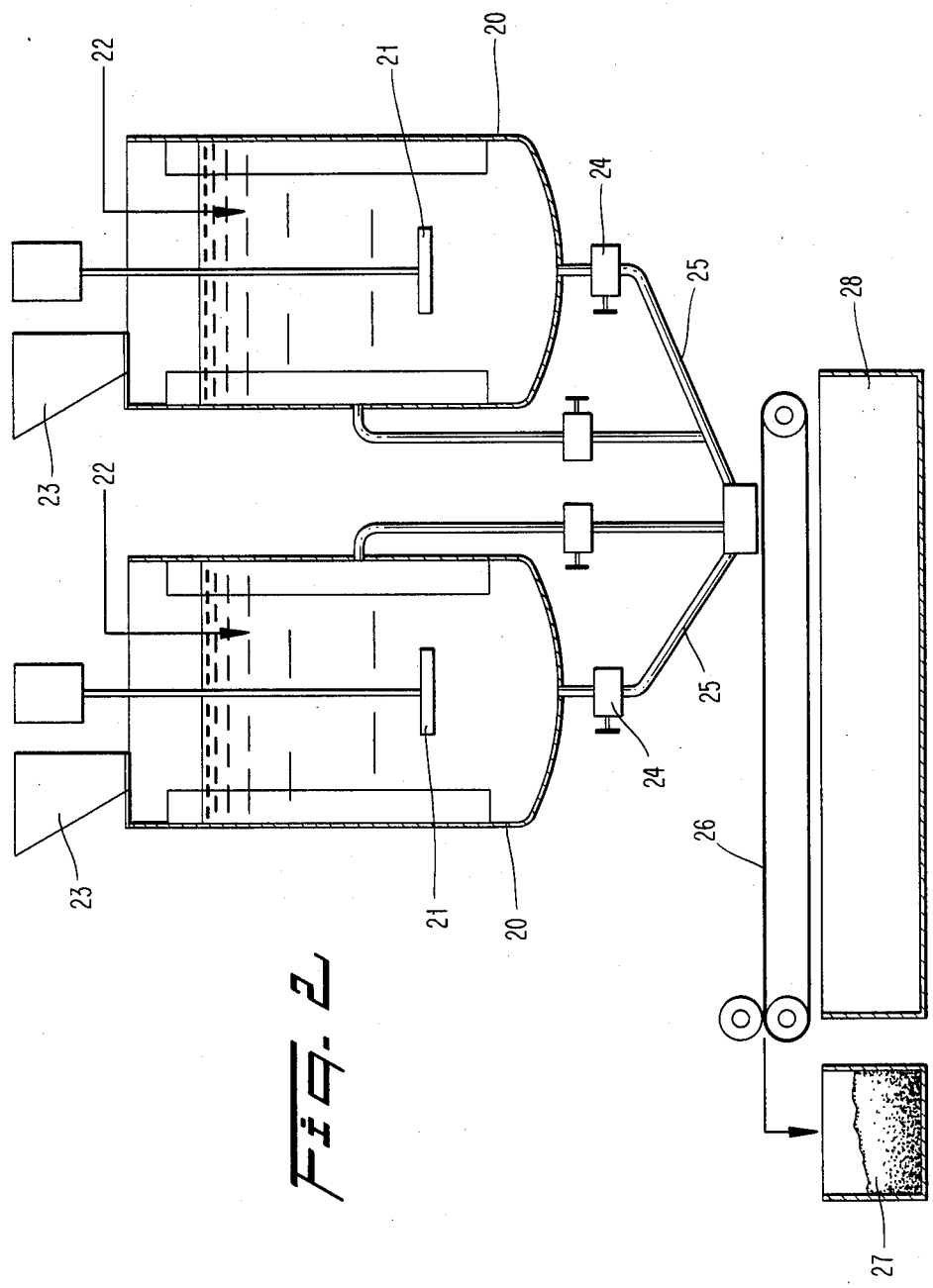
FIG. 2 is a schematic diagram representing an alternative embodiment of apparatus used in the method of the present invention.

FIG. 2 likewise shows a batch type treatment of a wastewater system using the present invention. However, two reaction tanks 20 are used, each having a stirrer 21. Wastewater 22 and a treatment composition 23, prepared in accordance with the present invention, are introduced into each tank 20. A valve 24 controls the flow from each tank 20, through pipes 25, into a separation device, such as a belt filter 26. The belt filter 26 separates the wastewater into a sludge 27, containing the contaminants, and a filtrate 28. A sludge dewatering device, as described above, may also be used to reduce the water content of the sludge.

It is to be understood that the apparati shown in FIGS. Nos. 1 and 2 are merely exemplary of the present invention. Other apparatus may be used within the scope of the present invention to remove the contaminants from a wastewater system.

The following examples further illustrate the process and composition of the present invention. It is to be understood that the examples are considered to be exemplary, and do not limit the scope of the invention.

EXAMPLE NO. 1

A. treatment composition, having the components indicated in Table No. 1, was prepared in accordance with the present invention.

TABLE NO. 1

| Component | % |
|---|---|
| Aluminum sulfate | 16.14 |
| Magnesium silicate | 1.57 |
| Dicarboxylic acid | 1.97 |
| Drilling gel | 33.86 |
| Soda ash | 3.15 |
| Polyelectrolyte | .79 |
| Calcium oxide | 26.38 |
| Calcium bentonite | 16.14 |

The prepared treatment composition was introduced into a wastewater system, having the contaminants indicated in Table No. 2.

TABLE NO. 2

| Contaminant | Untreated (mg/l) |
|---|---|
| Copper | 11.3 |
| Nickel | 25.7 |
| Zinc | 4.6 |
| Chromium | 1.6 |
| Iron | 78.1 |

After mixing the wastewater and treatment composition together, they were allowed to settle. The wastewater was tested and found to have the contaminant concentrations listed in Table No. 3.

TABLE NO. 3

| Contaminant | Treated (mg/l) | Percent Removal |
|---|---|---|
| Copper | .08 | 99.3 |
| Nickel | 0.4 | 98.4 |
| Zinc | 0.01 | 99.8 |
| Chromium | 0.03 | 98.1 |
| Iron | 1.30 | 98.3 |

The experiment shows that a composition of the present invention effectively reduces the copper, nickel, zinc, chromium, and iron contamination contained in wastewater, by approximately 98 to 99%.

EXAMPLE NO. 2

A treatment composition, having the components indicated in Table No. 4, was prepared in accordance with the present invention.

TABLE NO. 4

| Component | % |
|---|---|
| Aluminum Sulfate | 9.5 |
| Magnesium Silicate | 1.6 |
| Dicarboxylic Acid | 1.9 |
| Drilling Gel | 33 |
| Soda Ash | 3.0 |
| Polyelectrolyte | 0.8 |
| Lime | 26.8 |
| Calcium Bentonite | 23.3 |

The prepared treatment composition was introduced into a wastewater system having the contaminants indicated in Table No. 5.

TABLE NO. 5

| Contaminant | Untreated (mg/l) |
|---|---|
| Copper | 8.5 |
| Nickel | 19.5 |
| Zinc | 3.5 |
| Chromium | 1.2 |
| Iron | 58.6 |

After allowing the treatment composition and wastewater to mix and settle, the wastewater was tested and found to have the contaminant concentrations listed in Table No. 6.

TABLE NO. 6

| Contaminant | Treated (mg/l) | Percent Removal |
|---|---|---|
| Copper | 0.13 | 98.5 |
| Nickel | 0.2 | 98.9 |
| Zinc | 0.1 | 97.1 |
| Chromium | 0.0 | 100.0 |
| Iron | 0.90 | 99.8 |

The experiment shows that a treatment composition of the present invention effectively reduces the copper, nickel, zinc, chromium, and iron contamination contained in wastewater by between 97 and 100%.

EXAMPLE NO. 3

A treatment composition, having the components indicated in Table No. 7, was prepared in accordance with the present invention.

TABLE NO. 7

| Component | % |
|---|---|
| Aluminum Sulfate | 16.1 |
| Magnesium Silicate | 1.6 |
| Adipic Acid | 2.0 |
| Drilling Gel | 33.9 |
| Soda Ash | 3.1 |
| Polyelectrolyte | 0.8 |
| Lime | 26.4 |
| Calcium Bentonite | 16.1 |

The treatment composition of Table No. 7 was added to wastewater samples from stations used in removing copper from etching solutions. The results are provided in Table No. 8.

TABLE NO. 8

| Water Sample Type | Flow (Gal/Min) | Untreated Copper (mg/l) | Treated (PPM) | Removal % | Quantity of Treatment Composition (g/l) |
|---|---|---|---|---|---|
| Abrading | 7.5 | 2.5 | 0.17 | 93 | 2.0 |
| Final bur | 3.4 | 8.72 | 0.16 | 98 | 2.0 |
| — | 30.0 | 2.90 | 0.10 | 97 | 2.0 |

In like manner, two grams (2 g) of a treatment composition, having the components indicated in Table No. 9, were also added to a wastewater sample from one of the stations, with the result indicated in Table No. 10.

TABLE NO. 9

| Component | % |
|---|---|
| Aluminum Sulfate | 9.8 |
| Magnesium Silicate | 1.9 |
| Adipic Acid | 2.3 |
| Drilling Gel | 40.2 |
| Soda Ash | 3.8 |
| Polyelectrolyte | 0.9 |
| Lime | 12.6 |
| Calcium Bentonite | 28.5 |

TABLE NO. 10

| Water Sample Type | Flow (Gal/Min) | Untreated Copper (mg/l) | Treated Copper (PPM) | % Removal |
|---|---|---|---|---|
| Rinse | 40.0 | 9.85 | 0.50 | 95 |

The experiments of Example No. 3 show that a treatment composition of the present invention effectively reduces the copper contamination contained in a wastewater system by removing 95% of the copper present in the wastewater.

EXAMPLE NO. 4

A treatment composition, having the components indicated in Table No. 11, was prepared in accordance with the present invention.

TABLE NO. 11

| Component | % |
|---|---|
| Aluminum Sulfate | 19.7 |
| Magnesium Silicate | 2 |
| Adipic Acid | 2.5 |
| Drilling Gel | 41.9 |
| Polyelectrolyte | 1 |
| Lime | 13.3 |
| Calcium (Southern) Bentonite | 19.7 |

The treatment composition was added to various samples of a wastewater system, containing 10 mg of copper in 500 ml of wastewater. The wastewater and treatment composition were mixed for three (3) minutes. The results are provided in Table No. 12.

TABLE NO. 12

| Sample No. | Weight of Composition Added (g) | Mixing Time Min. | Initial Conc. of Cu mg/l | Final Conc. of Cu mg/l | pH of Filtrate | Settling Time Min. |
| --- | --- | --- | --- | --- | --- | --- |
| 1 | 0.25 | 3 | 10.0 | 1.10 | 6.1 | 2:60 |
| 2 | 0.50 | 3 | 10.0 | 0.20 | 6.3 | 2:00 |
| 3 | 0.75 | 3 | 10.0 | 0.10 | 6.4 | 1:66 |
| 4 | 1.00 | 3 | 10.0 | 0.00 | 6.6 | 1:00 |

The results indicate that as the amount of the treatment composition of Table No. 11 added to the wastewater was increased, there was an increase in the effectiveness of the copper removal from the wastewater.

EXAMPLE NO. 5

0.75 g of a treatment composition, having the components indicated in Table No. 11, was added to various samples of a wastewater system having 10 ppm copper in 500 ml. of wastewater. The wastewater samples were mixed for varying time periods. The results are provided in Table No. 13.

TABLE NO. 13

| Mixing Time Min. | Final Conc. mg/l | pH of Filtrate | Settling Time Min. |
| --- | --- | --- | --- |
| 1:00 | 0.6 | 6.2 | 3:00 |
| 2:00 | 0.3 | 6.2 | 3:00 |
| 3:00 | 0.1 | 6.6 | 1:30 |
| 4:00 | 0.0 | 6.6 | 1:30 |

The results shown in Table No. 13 indicate that as the mixing time is increased, the removal of copper from the wastewater becomes more effective. Accordingly, an increase in mixing time may allow for the use of a lower concentration of the treatment composition to remove a given contaminant concentration from a wastewater system.

EXAMPLE NO. 6

In accordance with the present invention, the treatment composition of Table No. 14 was prepared.

TABLE NO. 14

| Component | Grams | Actual Percentage |
| --- | --- | --- |
| Aluminum sulfate | 20.5 | 16.14 |
| Magnesium silicate (EMTAL 500, ground talc) | 2.0 | 1.57 |
| Adipic acid | 2.5 | 1.97 |
| Activated montmorillonite, drilling gel (International Gel) | 43.0 | 33.86 |
| Sodium carbonate | 4.0 | 3.15 |
| Nonionic Polyelectrolyte (Celanese 1082) | 1.0 | .79 |
| Calcium oxide (lime) | 33.5 | 26.38 |
| Calcium bentonite (Dixie Bond) | 20.5 | 16.14 |

The treatment composition of Table No. 14 was added to a one liter sample of wastewater containing 11 ppm copper. The treatment composition and wastewater sample were stirred for about 4 minutes, and then filtered. The wastewater was reanalyzed for copper content. The analysis indicated that the wastewater, after treatment, contained less than 2 ppm copper.

EXAMPLE NO. 7

In accordance with the present invention, the two treatment composition of Table No. 15 were prepared.

TABLE NO. 15

| Component | Treatment Composition No. 1 Actual Percentage | Treatment Composition No. 2 Actual Percentage |
| --- | --- | --- |
| Aluminum Sulfate | 16.67 | 16.67 |
| Magnesium Silicate | 1.63 | 1.63 |
| Dicarboxylic Acid | 2.03 | 2.03 |
| Drilling Gel | 34.96 | 34.96 |
| Polyelectrolyte | .81 | .81 |
| Calcium Oxide | 10.97 | 10.97 |
| Calcium Bentonite | 16.67 | 16.67 |
| Lignite | 8.13 | 16.26 |
| Calcium Oxide | 8.13 | — |

The two treatment compositions of Table 15 were added to samples of a wastewater system in an equalization tank, having a clarifier inlet. The results of the treatment are provided in Table No. 16.

TABLE NO. 16

| Equalization Tank (Clarifier Inlet) | pH | Lead (mg/l) | Nickel (mg/l) | Zinc (mg/l) | Copper (mg/l) | Cyanide (T) (mg/l) | Cyanide (A) (mg/l) |
| --- | --- | --- | --- | --- | --- | --- | --- |
| Untreated | 6.6 | 1.9 | 0.79 | 7.4 | 1.02 | <0.07 | <0.07 |
| Treated with No. 2 | 6.45 | <0.01 | 0.46 | 3.4 | 0.07 | <0.07 | <0.07 |
| Treated with No. 1 | 6.4 | <0.01 | 0.46 | 1.8 | 0.07 | <0.07 | <0.07 |

The results indicate that 99% of the lead, 93% of the copper, and 42% of the nickel were removed from the wastewater, in both treatment trials. In one trial, 54% of the zinc was removed from the wastewater, and in the second trial, 75% of the zinc was removed.

EXAMPLE NO. 8

The treatment composition of Table No. 17 was prepared in accordance with the present invention. Three grams (3 g.) of the treatment composition were added to the wastewater contained in an eqaulization tank, at the clarifier inlet. The results of the treatment are shown in the Table No. 18.

TABLE No. 17

| Component | % |
| --- | --- |
| Aluminum Sulfate | 16.14 |
| Magnesium Silicate | 1.57 |
| Dicarboxylic Acid | 1.97 |
| Drilling Gel | 33.86 |
| Soda Ash | 3.15 |
| Polyelectrolyte | 0.79 |
| Calcium Oxide | 26.38 |

TABLE No. 17-continued

| Component | % |
|---|---|
| Calcium Bentonite | 16.14 |

TABLE No. 18

| Equalization Tank (Clarifier Inlet) | pH | Lead (mg/l) | Nickel (mg/l) | Zinc (mg/l) | Copper (mg/l) | Cyanide (T) (mg/l) | Cyanide (A) (mg/l) |
|---|---|---|---|---|---|---|---|
| Untreated | 6.6 | 1.9 | 0.79 | 7.4 | 1.02 | <0.07 | <0.07 |
| Treated | 8.5 | <0.01 | 0.20 | 0.09 | 0.07 | <0.07 | <0.07 |

The results indicate that 99% of the lead, 75% of the nickel, 99% of the zinc, and 94% of the copper were removed from the wastewater.

EXAMPLE NO. 9

The treatment composition of Table No. 19 was prepared in accordance with the present invention. Four grams (4 g) of the treatment composition were added to a wastewater system. The results of the treatment are shown in Table No. 20.

TABLE No. 19

| Component | % |
|---|---|
| Aluminum Sulfate | 34.6 |
| Magnesium Silicate | 1.5 |
| Dicarboxylic Acid | 1.9 |
| Drilling Gel | 32.7 |
| Soda Ash | 3.0 |
| Polyelectrolyte | .8 |
| Calcium Oxide | 10.3 |
| Calcium Bentonite | 15.6 |

TABLE No. 20

| Wastewater | pH | Lead (mg/l) | Nickel (mg/l) | Zinc (mg/l) | Copper (mg/l) | Cyanide (T) (mg/l) | Cyanide (A) (mg/l) |
|---|---|---|---|---|---|---|---|
| Untreated | 11.5 | 7.9 | 0.34 | 4.4 | 0.96 | 0.62 | 0.62 |
| Treated | 11.3 | 0.18 | 0.37 | 0.07 | 0.44 | 0.28 | 0.28 |

The results indicate that 98% of the lead, 98% of the zinc, 55% of the copper, and 57% of the cyanide were removed from the wastewater.

EXAMPLE NO. 10

The treatment compositions of Tables 21-23 were prepared in accordance with the present invention. The treatment compositions were added to industrial wastewater samples containing hexane solubles (oil and grease) and phosphates. The results of the treatments are provided in Table No. 24.

TABLE No. 21

| Component | % |
|---|---|
| Aluminum Sulfate | 24.8 |
| Magnesium Silicate | 2 |
| Adipic Acid | 2.5 |
| Drilling Gel | 38.6 |
| Polyelectrolyte | 1.5 |
| Lime | 9.9 |
| Calcium (Southern) Bentonite | 20.8 |

TABLE No. 22

| Component | % |
|---|---|
| Aluminum Sulfate | 24.6 |
| Magnesium Silicate | 2.0 |
| Adipic Acid | 2.0 |
| Drilling Gel | 38.4 |
| Polyelectrolyte | 1.5 |
| Lime | 10.8 |
| Calcium (Southern) Bentonite | 20.7 |

TABLE No. 23

| Component | % |
|---|---|
| Aluminum Sulfate | 17.8 |
| Magnesium Silicate | 2.0 |
| Adipic Acid | 2.5 |
| Drilling Gel | 37.6 |
| Polyelectrolyte | 1.5 |
| Lime | 13.0 |
| Sodium (Western) Bentonite | 25.7 |

TABLE No. 24

| Sample | Hexane Soluble (Oil & Grease) (mg/l) | % Removal | pH | Phosphate (PO4) (mg/l) | % Removal |
|---|---|---|---|---|---|
| UNTREATED - SAMPLE A | 752 | — | 6.8 | 56.4 | — |
| TREATED WITH COMPOSITION OF TABLE 21 | | | | | |
| 4.5 g/l | 24 | 96.8 | 6.9 | 0.52 | 98.9 |
| 6.0 g/l | 77 | 89.8 | 6.8 | 0.46 | 99.0 |
| TREATED WITH COMPOSITION OF TABLE 22 | | | | | |
| 4.5 g/l | 70 | 90.7 | 6.8 | 0.37 | 99.4 |
| 6.0 g/l | 68 | 91.0 | 6.8 | 0.43 | 99.2 |
| UNTREATED - SAMPLE B | 204 | — | 6.9 | 43.0 | — |
| TREATED WITH COMPOSITION OF TABLE 23 | | | | | |
| 3 g/l | 50 | 81.0 | 7.2 | 2.08 | 95.0 |
| 4.5 g/l | 66 | 68.0 | 7.5 | 0.92 | 98.0 |

Depending upon the particular treatment composition and the amount of the composition used, the removal of hexane solubles from the wastewater ranged between 68.0 to 96.8%, and the removal of phosphates ranged between 95.0 to 99.4%.

EXAMPLE No. 11

The treatment composition of Table No. 25 was prepared in accordance with the present invention. The treatment composition was added to a wastewater system containing copper, iron, and suspended solid contaminants. The results of the treatment are provided in Table No. 26.

TABLE No. 25

| Component | % |
|---|---|
| Aluminum Sulfate | 15.4 |
| Magnesium Silicate | 1.5 |
| Dicarboxylic Acid | 1.9 |
| Drilling Gel | 32.2 |
| Soda Ash | 3 |
| Polyelectrolyte | .75 |
| Calcium Oxide | 10.1 |
| Calcium Bentonite | 10.1 |
| Carbon | 25 |

TABLE No. 26

| Sample | Copper (mg/l) | Iron (mg/l) | Suspended Solids (mg/l) |
|---|---|---|---|
| UNTREATED | 0.68 | 240 | 1,265 |
| TREATED - SAMPLE NO. 1 | 0.06 | 14.5 | — |
| TREATED - SAMPLE NO. 2 | 0.05 | 11 | 53 |

The results indicate that 91–92% of the copper, 94–95% of the iron, and 96% of the suspended solids were removed from the wastewater after treatment with the treatment compositions.

EXAMPLE NO. 12

The treatment composition of Table No. 27 was prepared in accordance with the present invention, and it was added to an untreated wastewater sample containing extractable organic compounds, such as oil and grease. The results of the treatment are provided in Table No. 28.

TABLE No. 27

| Component | % |
|---|---|
| Aluminum Sulfate | 24.8 |
| Magnesium Silicate | 2.0 |
| Dicarboxylic Acid | 2.5 |
| Drilling Gel | 38.6 |
| Polyelectrolyte | 1.5 |
| Calcium Oxide | 9.9 |
| Calcium Bentonite | 10.4 |
| Sodium Bentonite | 10.4 |

TABLE No. 28

| Sample | Amount of Treatment Composition (g/l) | Extractable Organics (PPM) |
|---|---|---|
| UNTREATED | — | 7,400 |
| TREATED - SAMPLE NO. 1 | 3 | 33 |
| TREATED - SAMPLE NO. 2 | 4 | 2 |

The results indicate that over 99% of the extractable organics, such as oil and grease, were removed from the wastewater system.

EXAMPLE NO. 13

The treatment composition of Table No. 29 was prepared in accordance with the present invention. Additionally, soda ash, in a concentration ranging from 1 to 4%, was also used in the treatment composition. The treatment composition, with varying amounts of soda ash, was added to 500 ml of wastewater containing 10.0 ppm copper. The results of the treatment are provided in Table No. 30.

TABLE No. 29

| Component | % |
|---|---|
| Aluminum Sulfate | 19.9 |
| Magnesium Silicate | 1.9 |
| Dicarboxylic acid | 2.4 |
| Drilling Gel | 41.8 |
| Polyelectrolyte | 0.9 |
| Calcium oxide | 12.9 |
| Calcium bentonite | 19.9 |

TABLE No. 30

| Percentage of Soda Ash | Weight of Composition (g) | Final Copper Conc. (ppm) | Mixing Time (min.) | Settling Time (min.) | pH of Filtrate |
|---|---|---|---|---|---|
| 1.0% | 1.00 | 2.6 | 3:00 | 7:00 | 5.5 |
| 2.0% | 1.00 | 1.1 | 3:00 | 1:50 | 5.7 |
| 3.5% | 1.00 | 0.1 | 3:00 | 1:00 | 6.6 |
| 4.0% | 1.00 | 0.0 | 3:00 | 1:20 | 6.6 |

The results indicate that as the amount of the soda ash in the treatment composition is increased, the removal of copper from the wastewater is more effective. An increase in soda ash also has the effect of reducing the settling time and adjusting the pH of the filtrate to a more neutral level.

EXAMPLE NO. 14

The sludge, resulting from the treatment by the present invention of wastewater from an electroplating plant, was subjected to mass analysis and EPA toxicity tests. In the EPA toxicity tests, the sludge samples were extracted for 24 hours at a pH of 5.0, with 0.5N acetic acid. The mass analysis was based upon dry weight. The results of the sludge tests are provided in Table No. 31.

TABLE No. 31

| Contaminant | EPA Toxicity Tests (mg/l) | mg. metal per kg. dry sludge Mass Analysis (ppm) |
|---|---|---|
| Arsenic | <0.01 | <1 |
| Barium | 0.1 | 39 |
| Cadmium | 0.05 | 3.9 |
| Chromium-Total | — | 44 |
| Chromium-Hex | <0.01 | — |
| Lead | 0.3 | 48.7 |
| Mercury | 0.01 | <1 |
| Selenium | 0.01 | <1 |
| Silver | 0.05 | 14.6 |
| Nickel | 1.5 | 490 |
| Copper | 0.07 | 89.7 |
| Zinc | 0.09 | 107.3 |
| Iron | 1.3 | 6,340 |
| Total Cyanide | <0.01 | <1 |

The results indicate that the contaminants do not appreciably leach from a sludge that is prepared and treated in accordance with the present invention.

EXAMPLE NO. 15

The treatment composition of Table No. 32 was prepared in accordance with the present invention. Two grams (2 g) of the treatment composition were added to wastewater containing organic materials from a textile plant. The results of the treatment are provided in Table No. 33.

TABLE No. 32

| Component | % |
|---|---|
| Aluminum Sulfate | 16.1 |
| Magnesium Silicate | 1.6 |
| Dicarboxylic Acid | 2.0 |
| Drilling Gel | 33.9 |
| Polyelectrolyte | 0.8 |
| Soda Ash | 3.1 |
| Calcium Oxide | 10.6 |
| Calcium Bentonite | 16.1 |
| Lime | 15.7 |

TABLE No. 33

| Sample | Suspended Solids (mg/l) | BOD (mg/l) | COD (mg/l) |
|---|---|---|---|
| UNTREATED | 14,000 | 5,000 | 35,000 |
| TREATED | 5 | 500 | 1,000 |

The results indicate that 99.9% of the suspended solids, 90% of the biochemical demand level, and 97% of the chemical oxygen demand level is removed by the treatment composition, in accordance with the present invention.

EXAMPLE NO. 16

The treatment composition of Table No. 34 was prepared in accordance with the present invention. The treatment composition was added in an effective amount to a waste system containing various starch contaminants. The results of the treatment are provided in Table No. 35.

TABLE No. 34

| Component | % |
|---|---|
| Aluminum Sulfate | 34.6 |
| Magnesium Silicate | 1.5 |
| Dicarboxylic Acid | 1.9 |
| Drilling Gel | 32.7 |
| Soda Ash | 3.0 |
| Polyelectrolyte | 0.8 |
| Calcium Oxide | 10.3 |
| Calcium Bentonite | 15.6 |

TABLE No. 35

| SAMPLE | Bod (mg/l) | Cod (mg/l) | pH |
|---|---|---|---|
| UNTREATED | 5,000 | 25,000 | — |
| TREATED | 509 | 1,421 | 7.5 |

The results indicates that 90% of the biochemical demand level and 94% of the chemical oxygen demand level is removed by the treatment composition, in accordance with the present invention.

It is to be understood that the above examples are only exemplary of the treatment composition and the treatment method of the present invention. Other treatment compositions and methods may be used without departing from the scope and spirit of the invention.

EXAMPLE NO. 17

A treatment composition, having the components identified in Table No. 36, was prepared in accordance with the present invention.

TABLE No. 36

| Components | % |
|---|---|
| Drilling Mud | 33.7 |
| Calcium Bentonite | 16.1 |
| Aluminum Sulfate | 16.1 |
| Calcium oxide | 29.0 |
| Zirconium | 0.4 |
| Nonionic Polyelectrolyte | 1.6 |
| Sodium Carbonate | 3.1 |

The prepared treatment composition was introduced into an electroplating wastewater system having the contaminants indicated in Table No. 37. After treatment, in which the wastewater and treatment composition were mixed together and allowed to settle, the wastewater was tested and found to have the contaminant concentrations listed in Table No. 37.

TABLE No. 37

| Contaminant | Untreated (mg/l) | Treated (mg/l) |
|---|---|---|
| Aluminum | 17.6 | 0.3 |
| Copper | 2.6 | 0.1 |
| Nickel | 11.1 | 0.7 |
| Iron | 2.0 | 0.2 |
| Zinc | 2.2 | 0.1 |
| pH | 4.2 | 8.5 |

EXAMPLE NO. 18

A treatment composition, having the components shown in Table No. 36, was mixed with a wastewater system containing copper and nickel contaminants, as provided in Table No. 38. After treatment, the wastewater was tested to have the contaminant concentrations listed in Table No. 38.

TABLE No. 38

| Contaminant | Untreated (mg/l) | Treated (mg/l) |
|---|---|---|
| Copper | 24.1 | 0.10 |
| Nickel | 407.0 | 0.041 |

A treatment composition, having the components shown in Table 36, was used to treat wastewater containing a zinc contaminant. The concentrations of the zinc before and after treatment are provided in Table No. 39.

TABLE No. 39

| Contaminant | Untreated (mg/l) | Treated (mg/l) |
|---|---|---|
| Zinc | 3.74 | 0.033 |
| pH | 5.67 | 7.41 |

EXAMPLE NO. 20

A treatment composition, having the components provided in Table No. 36, was mixed with wastewater from an electrochemical plant. After treatment, the wastewater was tested to have the contaminant concentrations shown in Table No. 40.

TABLE No. 40

| Contaminant | Untreated (mg/l) | Treated (mg/l) |
|---|---|---|
| Copper | 63.3 | 0.123 |
| Nickel | 57.3 | 0.095 |
| Chromium | 18.9 | 0.027 |
| Cyanide | — | 0.17 |

EXAMPLE NO. 21

A treatment composition, having its composition listed in Table No. 36, was used to treat wastewater from a metal finishing operation in an automobile manufacturing plant. Before treatment and after treatment, the wastewater was tested to have the component composition in Table No. 41.

TABLE No. 41

| Contaminant | Untreated (mg/l) | Treated (mg/l) |
| --- | --- | --- |
| Copper | 14.4 | 0.97 |
| Chromium | 15.4 | 0.02 |
| Nickel | 20.8 | 0.11 |
| Zinc | 64.0 | 0.18 |
| Phosphate | 6.4 | 0.10 |
| Oils, & Greases, soluble | 1,330.0 | 20.00 |

EXAMPLE NO. 22

A toxicity test in accordance with Federal EPA Guidelines was performed on sludge from the test listed in Table No. 41.

TABLE No. 42

| Component | Leachate (mg/l) |
| --- | --- |
| Arsenic | <0.001 |
| Barium | <0.01 |
| Cadmium | 0.07 |
| Mercury | 0.012 |
| Selenium | 0.001 |
| Silver | 0.02 |
| Copper | 0.06 |
| Nickel | 0.03 |
| Zinc | 0.04 |

EXAMPLE NO. 23

A treatment composition having the components listed in Table No. 36 was mixed with wastewater from the electrolysis nickel and electrolysis copper plating. Before and after treatment the water was tested to have the contaminant concentrations as shown in Table No. 43.

TABLE No. 43

| Component | Untreated (mg/l) | Treated (mg/l) |
| --- | --- | --- |
| Electrolysis nickel | 170 | <0.1 |
| pH (nickel) | 6.3 | 11.9 |
| Electroylsis Copper | 34 | 2.17 |
| pH (Copper) | 9.9 | 11.8 |

EXAMPLE NO. 24

A treatment composition having the components of Table No. 44 was mixed with wastewater from a ceramic tile manufacturing plant.

TABLE No. 44

| Component | % |
| --- | --- |
| Drilling Mud | 33.9 |
| Calcium Bentonite | 16.5 |
| Aluminum Sulfate | 14.2 |
| Calcium Oxide | 27.6 |
| Zirconium | 0.4 |
| Nonionic Polyelectrolyte | 0.8 |
| Ionic Polyelectrolyte | 2.4 |
| Sodium Carbonate | 3.2 |

Before and after treatment the water was tested to have the contaminant concentration in Table No. 45.

TABLE No. 45

| Contaminant | Untreated (mg/l) | Treated (mg/l) |
| --- | --- | --- |
| Zinc | 540.0 | 0.08 |
| Boron | 51.7 | 14.5 |
| Suspended solids | 6,650.0 | 26.0 |
| pH | 8.6 | 9.3 |

EXAMPLE NO. 25

A treatment composition having the components of Table No. 46 was used to treat rubber waste from an electric power plant.

TABLE No. 46

| Component | % |
| --- | --- |
| Drilling Mud | 34.0 |
| Calcium Bentonite | 16.2 |
| Aluminum Sulfate | 33.2 |
| Calcium Oxide | 11.6 |
| Zirconium | 0.4 |
| Nonionic Polyelectrolyte | 1.5 |
| Sodium Carbonate | 3.1 |

Before and after treatment, the water was tested to have the contaminant concentration shown in Table No. 47.

TABLE No. 47

| Contaminant | Untreated (mg/l) | Treated (mg/l) |
| --- | --- | --- |
| Cadmium | 0.14 | 0.07 |
| Copper | 35.0 | 0.41 |
| Iron | 940.0 | 0.52 |
| Suspended Solids | 38,000.0 | <2 |

EXAMPLE NO. 26

A toxicity test in accordance with Federal EPA Guidelines was performed on the sludge from the test listed in Table No. 47 is shown in Table No. 48.

TABLE No. 48

| Contaminant | Leachate Toxicity (mg/l) |
| --- | --- |
| Arsenic | <0.002 |
| Barium | <0.047 |
| Cadmium | <0.01 |
| Chromium | <0.01 |
| Lead | <0.01 |
| Mercury | <0.002 |
| Selenium | <0.30 |
| Aluminum | Not Required |
| Silver | 0.01 |
| Iron | 0.45 |
| Copper | 0.08 |
| Nickel | Not Required |
| Zinc | Not Required |

EXAMPLE NO. 27

A treatment composition having the components of Table No. 49 was used to treat the wastewater from the metal machine operation of an automobile manufacturing plant.

TABLE No. 49

| Component | % |
| --- | --- |
| Drilling Mud | 37.0 |
| Calcium Bentonite | 10.4 |
| Sodium Bentonite | 10.4 |
| Aluminum Sulfate | 23.7 |
| Calcium Oxide | 12.3 |
| Zirconium | 0.5 |
| Nonionic Polyelectrolyte | 1.9 |

TABLE No. 49-continued

| Component | % |
|---|---|
| Sodium Carbonate | 3.8 |

Before and after treatment, the wastewater was tested to have the contaminant concentrations in Table No. 50.

TABLE No. 50

| Contaminant | Untreated (mg/l) | Treated (mg/l) |
|---|---|---|
| Oil and Grease, soluble | 1,330.0 | 4.0 |

What is claimed is:

1. A treatment composition for removing heavy metals from wastewater, comprising effective amounts of the following to remove the heavy metals:
   (a) naturally occurring montmorillonite containing at least 60% silica;
   (b) bentonite selected from the group consisting of calcium bentonite, sodium bentonite, and combinations thereof;
   (c) one or more flocculants;
   (d) an alkali metal or alkaline earth metal carbonate; and
   (e) a catalyst comprising zirconium and at least one polyelectrolyte.

2. The treatment composition of claim 1, wherein the flocculant is selected from the group consisting of a aluminum sulfate, calcium oxide, calcium hydroxide, lime, and combinations thereof.

3. The treatment composition of claim 1, wherein the polyelectrolyte is selected from the group consisting of nonionic polyelectrolytes, ionic polyelectrolytes, and combinations thereof.

4. The treatment composition of claim 1, further comprising lignite.

5. The treatment composition of claim 1, further comprising activated carbon.

6. The treatment composition of claim 1 wherein the percent weight of naturally occurring montmorillonite is 25 to 49%, the present weight of bentonite is 14 to 30%, the percent weight of the flocculants is 13 to 68%, the percent weight of the alkali metal or alkaline earth metal carbonate is 1 to 4% and the percent weight of the catalyst is 1.2 to 5.5%.

7. A treatment composition for removing heavy metals from wastewater, comprising:
   (a) about 5 to 38% of aluminum sulfate;
   (b) about 1 to 4% of calcium carbonate, sodium carbonate, or a combination thereof;
   (c) about 25 to 49% naturally occurring montmorillonite containing at least 60% silica;
   (d) about 1.2 to 5.5% of a catalyst comprising zirconium and at least one polyelectrolyte;
   (e) about 8 to 30% of at least one of calcium oxide, calcium hydroxide, lime and combinations thereof; and
   (f) about 14 to 30% bentonite selected from the group consisting of calcium bentonite, sodium bentonite, and combinations thereof.

8. A treatment composition as in claim 7, further comprising 1 to 10% soda ash.

9. A treatment composition as in claim 7, further comprising 5 to 20% lignite.

10. A treatment composition as in claim 7, wherein the polyelectrolyte is selected from the group consisting of nonionic polyelectrolytes, ionic polyelectrolytes, and combinations thereof.

11. A treatment composition as in claim 13, further comprising activated carbon.

12. A treatment composition for removing heavy metals from wastewater, consisting essentially of effective amounts of the following to remove the heavy metals:
   (a) naturally occurring montmorillonite containing at least 60% silica;
   (b) bentonite selected from the group consisting of calcium bentonite, sodium bentonite, and combinations thereof;
   (c) one or more flocculants;
   (d) an alkali metal or alkaline earth metal carbonate; and
   (e) a catalyst comprising zirconium and at least one polyelectrolyte.

13. A method of treating wastewater containing heavy metals to remove the heavy metals, comprising the steps of:
   (a) introducing into wastewater containing one or more heavy metals a treatment composition comprising naturally occurring montmorillonite containing at least 60% silica, bentonite selected from the group consisting of calcium bentonite, sodium bentonite, and combinations thereof, one or more flocculants, an alkali metal or alkaline earth metal carbonate, and a catalyst comprising zirconium and at least one polyelectrolyte;
   (b) mixing the treatment composition with the wastewater containing the heavy metals for a time sufficient to form a floc containing the heavy metals; and
   (c) filtering the wastewater to separate the floc into a sludge containing the heavy metals and a filtrate.

14. The method as in claim 13, further comprising the step of dewatering the sludge produced by the filtering step.

15. The method as in claim 13, wherein the treatment composition is introduced into the wastewater in a continuous procees.

16. The method as in claim 13, wherein the treatment composition is introduced into the wastewater in a batch type process.

17. The method as in claim 13, wherein the treatment composition also includes lignite.

18. The method as in claim 13, wherein the polyelectrolyte is selected from the group consisting of nonionic polyelectrolytes, ionic polyelectrolytes, and combinations thereof.

19. The method as in claim 13, wherein the flocculant is selected from the group consisting of aluminum sulfate, calcium oxide, calcium hydroxide, lime, and combinations thereof.

20. The method as in claim 13, wherein the treatment composition also includes activated carbon.

21. The method as in claim 13, wherein the heavy metal is selected from the group consisting of aluminum, copper, iron, silver, zinc, nickel, lead, cadmium, chromium and mixtures thereof.

22. The treatment composition of claim 1, wherein the alkali metal or alkaline earth metal carbonate is selected from the group consisting of calcium carbonate, sodium carbonate and combinations thereof.

* * * * *